(12) United States Patent
Stubner

(10) Patent No.: US 7,945,985 B2
(45) Date of Patent: May 24, 2011

(54) WINDSCREEN WIPER DEVICE, PARTICULARLY FOR A MOTOR VEHICLE

(75) Inventor: Armin Stubner, Buehl-Altschweier (DE)

(73) Assignee: Robert Bosch GmbH, Stuttgart (DE)

( * ) Notice: Subject to any disclaimer, the term of this patent is extended or adjusted under 35 U.S.C. 154(b) by 1063 days.

(21) Appl. No.: 10/594,288

(22) PCT Filed: Feb. 14, 2005

(86) PCT No.: PCT/EP2005/050638
§ 371 (c)(1), (2), (4) Date: Apr. 2, 2007

(87) PCT Pub. No.: WO2005/092679
PCT Pub. Date: Oct. 6, 2005

(65) Prior Publication Data
US 2007/0199173 A1    Aug. 30, 2007

(30) Foreign Application Priority Data

Mar. 26, 2004 (DE) .......................... 10 2004 015 426

(51) Int. Cl.
*B60S 1/08* (2006.01)

(52) U.S. Cl. .............. 15/250.12; 15/250.3; 318/DIG. 2; 318/471; 318/473; 318/271; 318/268; 388/934

(58) Field of Classification Search ................. 15/250.3, 15/250.12, 250.001; 318/DIG. 2, 461, 471, 318/443, 483, 434, 444, 472, 473, 268; 388/800, 838, 934; 361/24, 25, 27
See application file for complete search history.

(56) References Cited

U.S. PATENT DOCUMENTS

| | | | |
|---|---|---|---|
| 4,320,329 A | 3/1982 | Gille et al. | |
| 4,542,324 A | 9/1985 | Leuthen | |
| 5,291,109 A | 3/1994 | Peter | |
| 5,630,009 A | 5/1997 | Hayden | |
| 2003/0169007 A1* | 9/2003 | Ashiya et al. | ................. 318/471 |

FOREIGN PATENT DOCUMENTS

| | | |
|---|---|---|
| DE | 101 57 386 | 6/2003 |
| EP | 1 176 066 | 1/2002 |
| JP | 2003146187 | 5/2003 |
| JP | 07-009667 | 1/2007 |

* cited by examiner

*Primary Examiner* — Gary K Graham
(74) *Attorney, Agent, or Firm* — Michael Best & Friedrich LLP

(57) ABSTRACT

Windshield wiper device (10), particularly for a motor vehicle, having at least an electric motor drive (24) is proposed. This comprises an electric motor drive, which can be driven with at least one first speed (V1) and one second speed (V2). According to the invention, a temperature detection means (40) for detecting the operating temperature of the drive (24) and at least one switching means (50) are provided, which, when operating the drive (24) at the second speed (V2), switches the drive (24) from the second speed (V2) to the first speed (V1) when a predetermined operating temperature (T1) is exceeded.

15 Claims, 2 Drawing Sheets

WINDSCREEN WIPER DEVICE, PARTICULARLY FOR A MOTOR VEHICLE

BACKGROUND OF THE INVENTION

The invention relates to a windshield wiper device, particularly for a motor vehicle in accordance with the species of the independent claims.

Numerous windshield wiper devices are known, which have an electric motor drive that can be driven at a first speed and at a second speed. The first and second speeds of the drive correlate directly with the speed at which the wiper blades glide over the windshield of the motor vehicle. For this purpose, the normal windshield wiper device has at least two levels, particularly a level I and a level II, which correspond to the different speeds of the wiper blades on the windshield. In the case of precipitation, the vehicle driver or a rain sensor control device will switch the windshield wiper device in accordance with the strength of the precipitation to level I or, particularly in the case of heavy rain, to level II.

If the windshield wiper device has been switched to level II, i.e., the wiper blades are moving very quickly in a pendulum fashion over the windshield, the wiper blades can run dry as the precipitation subsides, i.e., wipe over a relatively dry windshield. Since in this case the wiper blade is no longer gliding over a film of water, the friction between the windshield and the wiper blade increases greatly and the drive is thereby put under a lot of stress. This leads to the drive overheating and in some circumstances to a total breakdown of the windshield wiper device.

SUMMARY OF THE INVENTION

The windshield wiper device in accordance with the invention has the advantage that a temperature detection means for detecting the operating temperature of the drive and at least one switching means are provided, which, when operating the drive at the second speed, switches the drive from the second speed to the first speed when a predetermined operating temperature is exceeded. The drive is prevented from overheating in this way and the windshield wiper device is thereby protected from a total breakdown. This also represents a considerable increase in safety for the driver since, in the case of a total breakdown of the windshield wiper device, the driver's vision would be considerably reduced.

The speeds of the drive advantageously differ from a standstill so that optimal wiper operation is always guaranteed.

It is especially advantageous if the second speed is higher than the first speed since reliable cooling of the drive is facilitated in this way. This applies in particular when the current consumption of the drive is lower at a lower speed, whereby less energy is converted to heat.

In a simple and cost-effective embodiment, the drive has at least three connections, in particular a first connection for the first speed, a second connection for the second speed as well as a connection to ground.

In addition, it must be viewed as advantageous if the switching means is able to interrupt the second connection since this can be realized in a simple and cost-effective manner.

If a diode, in particular a power diode, is switched between the first connection and the second connection, then the first connection is automatically energized when the second connection is interrupted.

It is particularly advantageous if an additional switching means is provided, which switches off the drive when an additional predetermined operating temperature is exceeded in order to protect the drive from further overheating, particularly self-destruction.

This can be realized in the simplest and most cost-effective manner if the additional switching means is connected to the connection to ground.

In order to avoid the effects of electromagnetic interference, it is advantageous to switch filter elements between the switching means and the first or second connection.

It is especially advantageous if the temperature recording means and the switching means are embodied as one piece as a thermal switch. These types of thermal switches are commercially available as one-part components and are therefore available cost effectively and in large unit numbers.

BRIEF DESCRIPTION OF THE DRAWINGS

One exemplary embodiment of the invention is depicted in the drawings and explained in greater detail in the following description. The drawings show.

DETAILED DESCRIPTION

Figure 1:
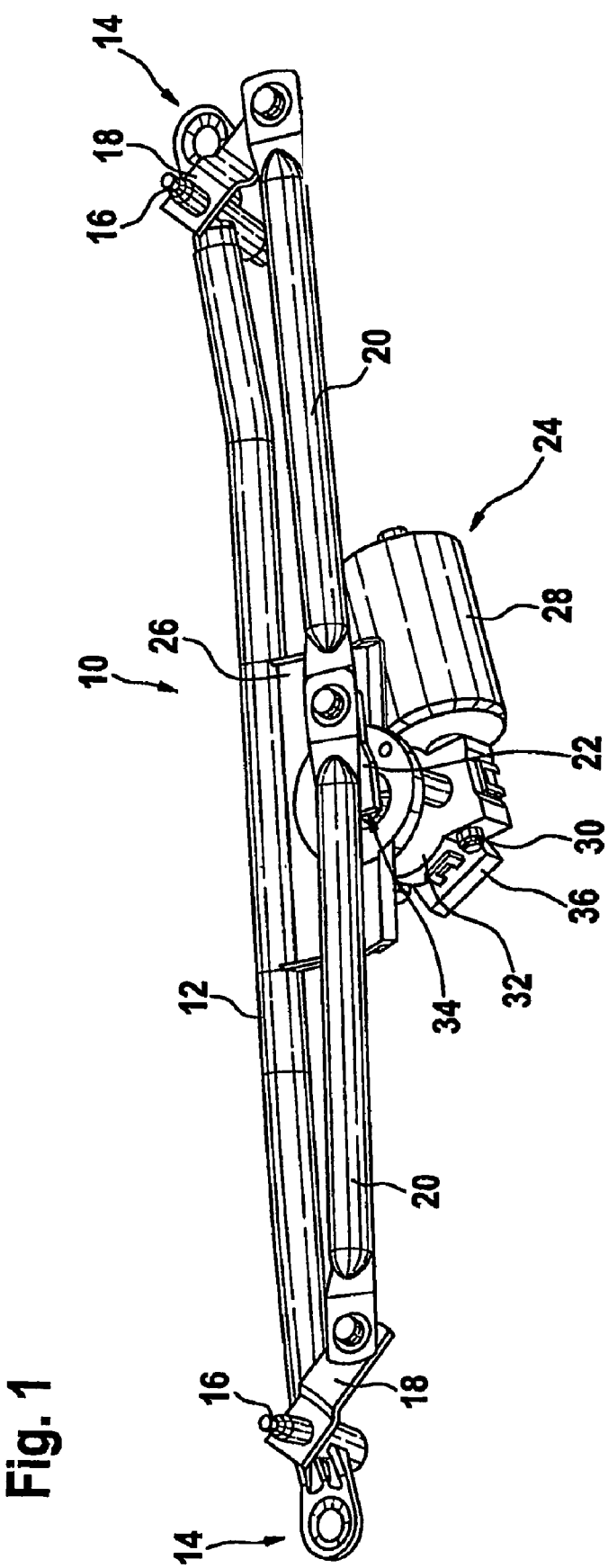
FIG. 1 A schematic representation of a windshield wiper device in accordance with the invention FIG. 2 A switching arrangement for a drive of a windshield wiper device in accordance with the invention

FIG. 1 shows a perspective representation is a windshield wiper device 10 in accordance with the invention. It is comprised essentially of a support tube 12 that has a longish shape and on each of whose ends a wiper bearing 14 is fastened. Positioned in each of these wiper bearings 14 are wiper shafts 16, which are connected in a rotationally secured manner to wiper arms with each wiper arm bearing a wiper blade on its free end. The wiper arm and wiper blade are not shown here for the sake of clarity. The wiper shafts 16 are driven by a drive crank 18, which is connected in a rotationally secure manner to the wiper shaft 16. Linked to the free end of the drive crank 18 is a thrust rod 20, which is connected on its end facing away from the drive crank 18 to an output crank 22. The output crank 22 is put into a rotational motion via a drive 24, which is embodied as an electric motor.

Because of the rotating movement of the output crank 22, the thrust rod 20 is put into a back-and-forth motion so that the drive crank 18 executes a pendulum movement. As a result, the wiper shaft 16 executes a rotational back-and-forth movement so that the wiper arms and wiper blades execute a pendulum movement over or on the windshield of the motor vehicle.

The drive 24 is fastened to the support tube 12 of the windshield wiper device 10 via a motor support 26. The drive 24 essentially has a housing 28 out of which an armature shaft 30 projects. The section of the armature shaft 30 that projects out of the housing 28 bears a worm that meshes with a worm wheel, which is arranged in a gear housing 32. The worm wheel is connected in a rotationally secured manner to an output shaft 34, which is in turn connected in a rotationally secured manner to the output crank 22 so that it executes a rotational movement in operation. Arranged on the gear housing 32 is a control housing 36, in which the filter elements 38 as well as at least one thermal switch as a combined temperature detection means 40 and switching means 50 and a diode 52 are arranged.

Figure 2:
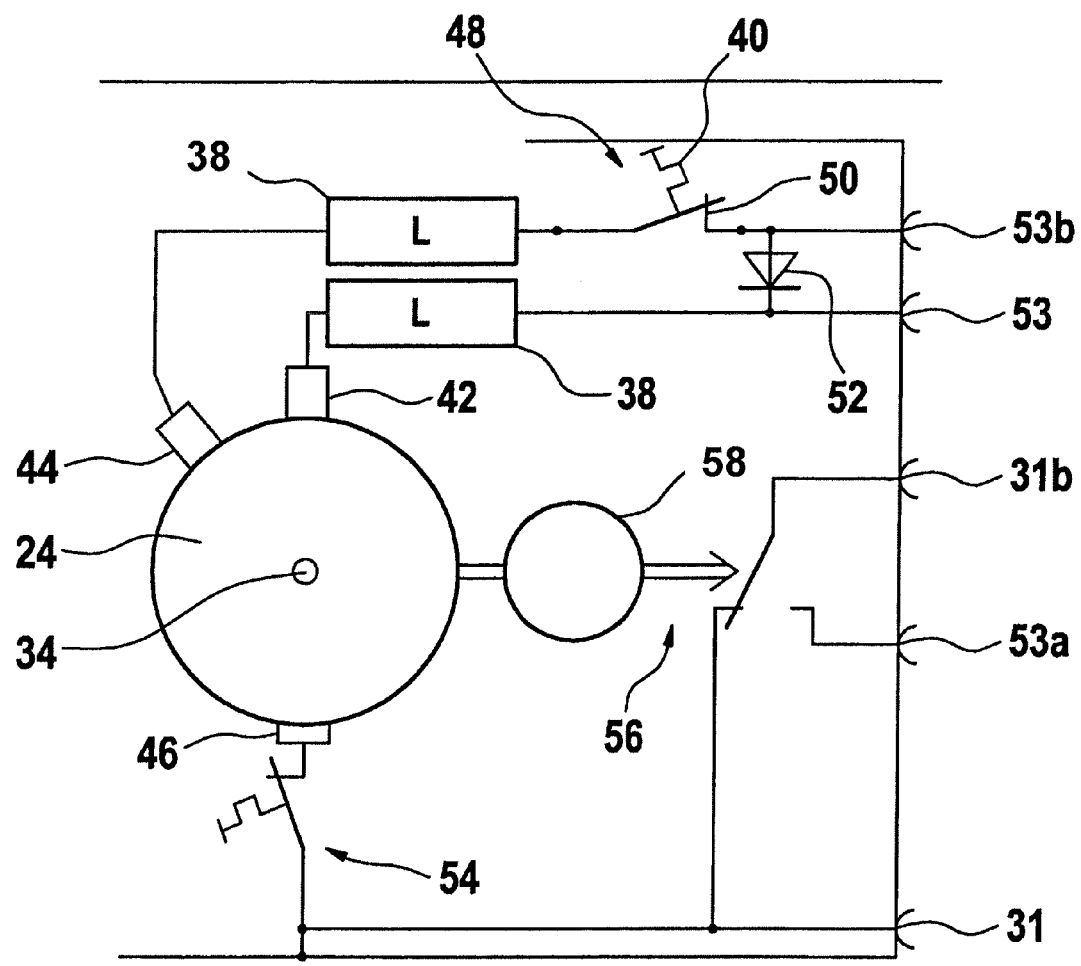

FIG. 2 shows a schematic representation of the switching arrangement in the control housing 36. The drive 24 in this case has a first connection 42, a second connection 44 as well as a connection to ground 46. The drive 24 is embodied in this case in such a way that when the first connection 42 is energized the output shaft 34 is moved at a first speed v1. Analogous to this, the output shaft 34 is moved at a second speed v2 when the second connection 44 is energized. For this purpose, the first connection 42 is connected to the terminal 53 of the vehicle wiring harness via a filter element 38, which eliminates electromagnetic interference. The terminal 53 of the vehicle wiring harness is energized when the windshield wiper device is switched into level I operation. Analogously, the second connection 44 is also connected to the terminal 53b of the vehicle wiring harness via one of the filter elements 38 for filtering out electromagnetic interference and this terminal is energized when the wiper device of the motor vehicle is switched to level II. A thermal switch 48 is switched between the terminal 53b of the vehicle wiring harness and the filter element 38, which is connected to the second connection 44 of the drive 24. This thermal switch is comprised of a temperature detection means 40 and a switching means 50. The switching means 50 interrupts the energizing of the second connection 44 as soon as the temperature of the drive exceeds a predetermined operating temperature T1. This is detected by the temperature detection means 40. The flow of current to the second connection 44 is interrupted as a result. Switched between the terminal 53b and the thermal switch 48 or the switching means 50 is a diode 52, which connects the terminal 53b in the forward conducting direction to the terminal 53. If the flow of current to the second connection 44 is interrupted by opening the switching means 50, the first connection 42 is energized via the diode 52 and the terminal 53b, thereby switching the output shaft 34 from the second speed v2 to the first speed v1. Because of the lower speed of the output shaft 34, the power of the drive 24 and therefore the heating of said drive is reduced. As a result, the drive 24 cools down as a rule until the switching temperature of the thermal switch 48 is fallen short of and the switching means 50 of the thermal switch 48 is closed again. As a consequence, the second connection 44 is energized again so that the output shaft 34 is again moved at the second speed v2. Because of the flow of current to the second connection 44, a generator voltage is induced on the first connection 42, which prevents current from flowing off from the terminal 53b in the direction of the first connection 42.

In this connection, the thermal switch 48 features a hysteresis behavior, i.e., the predetermined operating temperature T1 at which the switching element 50 is opened when this temperature is exceeded is somewhat higher than the temperature at which the switching means 50 is closed again when it is fallen short of. Continual opening and closing of the switching element 50 is prevented in this manner since in the range of temperature T1 there would otherwise be a continual change between the first and second speeds v1, v2, which could annoy the driver of the vehicle.

In the case of very high stress to the drive 24, it also might not cool down after being switched back to level I, but continue to heat up, however in a slow manner. In this case, in order to prevent the destruction of the drive 24, i.e., burn-out of a motor coil for example, the connection to ground 46 of the drive 24 has an additional thermal switch 54, which is connected to terminal 31 of the vehicle wiring harness. The terminal 31 of the vehicle wiring harness corresponds to the ground line. The additional thermal switch 54 interrupts the connection between the connection to ground 46 and the terminal 31, i.e., ground, when an additional predetermined operating temperature T2 is exceeded. This additional predetermined operating temperature T2 is higher than the first predetermined operating temperature T1 and is exceeded if the temperature of the drive 24 continues to rise in such a way that the additional predetermined operating temperature T2 is exceeded even when the first connection 42 is being energized, i.e., at level I or when opening the switching element 50. By opening the additional thermal switch 54, the drive 24 is completely shut down until it cools off again. The precise level of the predetermined operating temperature T1 is between approximately 100° C. and 150° C. and is dependent upon at which location of the drive 24 the thermal switch 48 or the temperature detection means 40 of the thermal switch 48 is arranged. This also applies mutatis mutandis to the additional thermal switch 54. This switch has a correspondingly greater additional predetermined operating temperature T2, which lies for example between 130 and 180° C. What is remarkable in this case is that the depicted switching arrangement requires no software or microprocessor-controlled elements whatsoever.

In addition, the windshield wiper device also has a park position switch 56, which can control additional movement sequences of the windshield wiper device 10 via a contact window path as an angle of rotation switching element 58.

In a variation of the invention, a separate cooling element, e.g., a ventilator or a Peltier element, can be operated in level II operation, i.e., at higher speed v2. Then, in the case of overheating in level I, i.e., at the lower speed v1, it can be advantageous for example to switch to the higher speed v2, i.e., to level II, when temperature T1 is exceeded since the drive 24 can be cooled better at this level. In accordance with the invention, when temperature T1 is exceeded, the drive 24 always switches to the level at which it cools off better, thereby preventing damage to the drive 24.

The invention claimed is:

1. Windshield wiper device (10), for a motor vehicle, having at least an electric motor drive (24), which can be driven with at least one first speed (v1) and a second speed (v2) characterized in that a temperature detection means (40) for detecting the operating temperature of the drive (24) and at least one switching means (50) are provided, which, when operating the drive (24) at the second speed (v2), switches the drive (24) from the second speed (v2) to the first speed (v1) when a predetermined operating temperature (T1) is exceeded, wherein the drive (24) has at least three connections (42, 44, 46), a first connection (42) for the first speed (v1), a second connection (44) for the second speed (v2) as well as a connection to ground (46), wherein a power diode is switched between the first connection (42) and the second connection (44) by the at least one switching means.

2. Windshield wiper device (10) according to claim 1, characterized in that the speeds (v1, v2) differ from a standstill.

3. Windshield wiper device (10) according to claim 2, characterized in that the second speed (v2) is higher than the first speed (v1).

4. Windshield wiper device (10) according to claim 3, characterized in that the switching means (50) is able to interrupt the second connection (44).

5. Windshield wiper device (10) according to claim 4, characterized in that an additional switching means (54) is provided, which switches off the drive (24) when an additional predetermined operating temperature (T2) is exceeded.

6. Windshield wiper device (10) according to claim 5, characterized in that the additional switching means (54) is connected to the connection to ground (46).

7. Windshield wiper device (10) according to claim 6, characterized in that filter elements are switched between the switching means (50) and the first and/or second connection (42, 44).

8. Windshield wiper device (10) according to claim 7, characterized in that the temperature detection means (40) and the switching means (50) are embodied as one piece as a thermal switch (48).

9. Windshield wiper device (10) according to claim 1, characterized in that the second speed (v2) is higher than the first speed (v1).

10. Windshield wiper device (10) according to claim 1, characterized in that the switching means (50) is able to interrupt the second connection (44).

11. Windshield wiper device (10) according to claim 10, characterized in that a power diode is switched between the first connection (42) and the second connection (44).

12. Windshield wiper device (10) according to claim 1, characterized in that an additional switching means (54) is provided, which switches off the drive (24) when an additional predetermined operating temperature (T2) is exceeded.

13. Windshield wiper device (10) according to claim 12, characterized in that the additional switching means (54) is connected to the connection to ground (46).

14. Windshield wiper device (10) according to claim 1, characterized in that filter elements are switched between the switching means (50) and the first and/or second connection (42, 44).

15. Windshield wiper device (10) according to claim 1, characterized in that the temperature detection means (40) and the switching means (50) are embodied as one piece as a thermal switch (48).

\* \* \* \* \*